(12) United States Patent
Shi et al.

(10) Patent No.: US 12,264,750 B2
(45) Date of Patent: Apr. 1, 2025

(54) WATER OUTLET CONTROL COMPONENT AND CONCEALED INSTALLED WATER OUTLET CONTROL DEVICE HAVING SAME

(71) Applicant: KAIPING YIZHAN VALVE CORE CO., LTD., Kaiping (CN)

(72) Inventors: Xianbing Shi, Kaiping (CN); Junfa Shen, Kaiping (CN)

(73) Assignee: KAIPING YIZHAN VALVE CORE CO., LTD., Kaiping (CN)

( * ) Notice: Subject to any disclaimer, the term of this patent is extended or adjusted under 35 U.S.C. 154(b) by 41 days.

(21) Appl. No.: 18/185,612

(22) Filed: Mar. 17, 2023

(65) Prior Publication Data

US 2024/0191803 A1  Jun. 13, 2024

(30) Foreign Application Priority Data

Dec. 7, 2022 (CN) .......................... 202223298140.0

(51) Int. Cl.
| | |
|---|---|
| *F16K 3/30* | (2006.01) |
| *F16K 3/26* | (2006.01) |
| *F16K 11/02* | (2006.01) |
| *F16K 11/074* | (2006.01) |

(52) U.S. Cl.
CPC ................ *F16K 3/30* (2013.01); *F16K 3/265* (2013.01); *F16K 11/02* (2013.01); *F16K 11/0743* (2013.01); *Y10T 137/86823* (2015.04)

(58) Field of Classification Search
CPC ......... F16K 11/0743; Y10T 137/86823; Y10T 137/86863
See application file for complete search history.

(56) References Cited

U.S. PATENT DOCUMENTS

| | | | | |
|---|---|---|---|---|
| 5,826,611 | A * | 10/1998 | Ko ........................ | G05D 23/136 |
| | | | | 137/454.6 |
| 6,805,151 | B1 * | 10/2004 | Chang ................... | F16K 27/045 |
| | | | | 137/270 |
| 2009/0205717 | A1 * | 8/2009 | Yuan ..................... | F16K 15/026 |
| | | | | 137/100 |
| 2012/0279595 | A1 * | 11/2012 | Huck .................... | F16K 27/045 |
| | | | | 137/896 |

* cited by examiner

*Primary Examiner* — Robert K Arundale
(74) *Attorney, Agent, or Firm* — Westbridge IP LLC

(57) ABSTRACT

Disclosed is a water outlet control component, which is installed on a water passing body. The water outlet control component comprises a water distributor, a valve core and a connector. The side wall of the water distributor is provided with a side water inlet through-flow opening corresponding to a water inlet interface on the water passing body and a side water outlet through-flow opening corresponding to a water outlet interface on the water passing body. The water distributor is further provided with an end surface water inlet through-flow opening corresponding to the side water inlet through-flow opening and an end surface water outlet through-flow opening communicated with the side water outlet through-flow opening. The valve core controls the connection or disconnection between the end surface water inlet through-flow opening and the end surface water outlet through-flow opening.

12 Claims, 8 Drawing Sheets

WATER OUTLET CONTROL COMPONENT AND CONCEALED INSTALLED WATER OUTLET CONTROL DEVICE HAVING SAME

CROSS-REFERENCE TO RELATED APPLICATIONS

This application claims priority to Chinese Patent Application No. 202223298140.0, filed on Dec. 7, 2022, the content of which is incorporated herein by reference in its entirety.

TECHNICAL FIELD

The present disclosure relates to a water outlet control component and a concealed installed water outlet control device having the water outlet control component.

BACKGROUND

The existing concealed installed water outlet control device usually comprises components such as a water passing body, a water distributor and a valve core, wherein the water passing body is provided with an inner cavity with a top opening and at least one water inlet interface and at least one water outlet interface provided on the side wall of the inner cavity. The side wall of the water distributor is provided with a side water inlet through-flow opening corresponding to each water inlet interface and a side water outlet through-flow opening corresponding to each water outlet interface. The water distributor is further provided with an end surface water inlet through-flow opening corresponding to each side water inlet through-flow opening and an end surface water outlet through-flow opening corresponding to each side water outlet through-flow opening. The valve core controls the connection or disconnection between the end surface water inlet through-flow opening and the end surface water outlet through-flow opening. However, the water distributor and the valve core of the existing concealed installed water outlet control device are usually installed on the water passing body independently. Specifically, the water distributor is usually installed in the water passing body first and then the valve core is connected with the water passing body during assembly. However, the valve core is separated from the water passing body first and then the water distributor is taken out from the water passing body during disassembly. In some countries (such as the United States), when the concealed installed water outlet control device is used, the water distributor and the valve core need to be disassembled first, and then the water distributor and the valve core are installed in the water distributor after welding the water distributor with the waterway pre-embedded in the wall, so as to prevent high-temperature welding from damaging the valve core and the water distributor. However, it is troublesome to disassemble and assemble the water distributor and the valve core in this way, which increases the installation man-hours, and has the problem of abnormal function resulted from improper assembly between the water distributor and the valve core.

SUMMARY

In view of this, in order to solve the above problems, the present disclosure provides a water outlet control component and a concealed installed water outlet control device having the same, which can realize the disassembly and assembly of the water outlet control component more conveniently and have more reliable functions.

In order to achieve the above purpose, the present disclosure provides a first technical scheme as follows.

A water outlet control component is provided, which is installed on a water passing body to control the connection or disconnection between a water inlet interface and a water outlet interface provided on the side wall of the water passing body, comprising:

a water distributor, wherein the side wall of the water distributor is provided with a side water inlet through-flow opening corresponding to the water inlet interface on the water passing body and a side water outlet through-flow opening corresponding to the water outlet interface on the water passing body, and the water distributor is further provided with an end surface water inlet through-flow opening corresponding to the side water inlet through-flow opening and an end surface water outlet through-flow opening communicated with the side water outlet through-flow opening;

a valve core, which controls the connection or disconnection between the end surface water inlet through-flow opening and the end surface water outlet through-flow opening;

a connector, which assembles the water distributor and the valve core into an integrated structure, wherein the connector is provided with a first connecting part connected with the water passing body.

In a preferred embodiment, the connector comprises a hollow valve sleeve, the bottom end of the valve sleeve forms an opening, the valve sleeve is sleeved outside the water distributor and the valve core through the opening, the top end of the valve sleeve is provided with a through hole through which the control end of the valve core protrudes, the part of the water distributor with the side water inlet through-flow opening and the side water outlet through-flow opening is located outside the valve sleeve, and the first connecting part is provided on the valve sleeve.

In a preferred embodiment, the connector further comprises a nut with an external thread, the top end of the water distributor is provided with an external flange, the nut abuts against the external flange, the inner wall of the opening of the valve sleeve is provided with an internal thread matched with the nut, and the water distributor and the valve core are assembled into an integrated structure through the threaded connection of the valve sleeve and the nut.

In a preferred embodiment, the number of the side water outlet through-flow openings is the same as that of the end surface water outlet through-flow openings, and the side water outlet through-flow opening corresponds to the end surface water outlet through-flow opening; alternatively, there are two side water outlet through-flow openings and one end surface water outlet through-flow opening, the two side water outlet through-flow openings are capable of being both communicated with the end surface water outlet through-flow opening, a Venturi tube is provided between the two side water outlet through-flow openings, under the action of the Venturi tube, the water flow of the end surface water outlet through-flow opening flows to one of the side water outlet through-flow openings, and when the downstream pipeline of the side water outlet through-flow opening is blocked from water, the water flow of the end surface water outlet through-flow opening is switched to the other of the side water outlet through-flow openings.

In order to achieve the above purpose, the present disclosure provides a second technical scheme as follows.

A concealed installed water outlet control device is provided, comprising:
- a water passing body, which is provided with an inner cavity with a top opening and at least one water inlet interface and at least one water outlet interface provided on the side wall of the inner cavity;
- a water distributor, wherein the side wall of the water distributor is provided with a side water inlet through-flow opening corresponding to the water inlet interface and a side water outlet through-flow opening corresponding to the water outlet interface, and the water distributor is further provided with an end surface water inlet through-flow opening corresponding to the side water inlet through-flow opening and an end surface water outlet through-flow opening communicated with the side water outlet through-flow opening;
- a valve core, which controls the connection or disconnection between the end surface water inlet through-flow opening and the end surface water outlet through-flow opening;
- a connector, which assembles the water distributor and the valve core into an integrated structure, wherein a first connecting structure is provided between the connector and the water passing body.

In a preferred embodiment, the connector comprises a hollow valve sleeve, the bottom end of the valve sleeve forms an opening, the valve sleeve is sleeved on the part of the water distributor and the valve core outside the inner cavity of the water passing body through the opening, the top end of the valve sleeve is provided with a through hole through which the control end of the valve core protrudes, and the part of the water distributor with the side water inlet through-flow opening and the side water outlet through-flow opening is located outside the valve sleeve.

In a preferred embodiment, the connector further comprises a nut with an external thread, the top end of the water distributor is provided with an external flange, the nut abuts against the external flange, the inner wall of the opening of the valve sleeve is provided with an internal thread matched with the nut, and the water distributor and the valve core are assembled into an integrated structure through the threaded connection of the valve sleeve and the nut.

In a preferred embodiment, a second connecting structure is provided between the water distributor and the valve sleeve, and when the water distributor is connected with the valve sleeve, the valve core is limited in a valve cavity encircled by the water distributor and the valve sleeve.

In a preferred embodiment, the first connecting structure comprises a plurality of first connecting parts which are provided at intervals in the circumferential direction on the outer wall of the bottom opening of the valve sleeve and a plurality of second connecting parts which are provided at intervals in the circumferential direction on the outer wall of the top opening of the water passing body, the first connecting parts are provided with through first bolt holes, the second connecting parts are provided with through second bolt holes, and the first connecting structure further comprises a bolt penetrating through the first bolt holes and the second bolt holes.

In a preferred embodiment, the connector and the water passing body are detachably connected through the first connecting structure.

In a preferred embodiment, the side water inlet through-flow opening and the side water outlet through-flow opening are provided with seals, respectively, to be in sealing communication with the water inlet interface and the water outlet interface.

In a preferred embodiment, the number of the side water outlet through-flow openings is the same as that of the end surface water outlet through-flow openings, and the side water outlet through-flow opening corresponds to the end surface water outlet through-flow opening; alternatively, there are two side water outlet through-flow openings and one end surface water outlet through-flow opening, the two side water outlet through-flow openings are capable of being both communicated with the end surface water outlet through-flow opening, a Venturi tube is provided between the two side water outlet through-flow openings, under the action of the Venturi tube, the water flow of the end surface water outlet through-flow opening flows to one of the side water outlet through-flow openings, and when the downstream pipeline of the side water outlet through-flow opening is blocked from water, the water flow of the end surface water outlet through-flow opening is switched to the other of the side water outlet through-flow openings.

Compared with the prior art, the present disclosure has the following beneficial effects.

1. According to the present disclosure, the connector is provided, and the connector assembles the water distributor and the valve core into an integrated structure, so that the water outlet control component is matched with the water passing body as an independent module, and the disassembly and assembly between the water outlet control component and the water passing body can be realized more conveniently. Moreover, the modular water outlet control component can complete functional tests such as water pressure test before leaving the factory. The self-function of the modular water outlet control component is not affected by the disassembly and assembly between the water outlet control component and the water passing body, so that the reliability of the function can be ensured, the function of the assembled whole component can meet the requirements, and the product quality can be improved.
2. The first connecting structure is provided between the connector and the water passing body, so that only the connector and the water passing body need to be disassembled and assembled during the disassembly and assembly. The water distributor and the valve core do not need to be separated and assembled, which is not only more convenient and efficient to be disassembled and assembled, but also can effectively avoid the problem of water leakage resulted from dislocation or looseness when the water distributor and the valve core are assembled after being separated. The product is more reliable.
3. The connector comprises a hollow valve sleeve and a nut, and the water distributor and the valve core are assembled into an integrated structure through the threaded connection of the valve sleeve and the nut, so that the structure is simple and the assembly is convenient.
4. The side water inlet through-flow opening and the side water outlet through-flow opening are provided with seals, respectively, to be in sealing communication with the water inlet interface and the water outlet interface. As a side sealing structure is used, the requirements on the connection strength of the first connecting structure can be reduced, and the risk of water channeling resulted from an improper installing force of the first connecting structure can be reduced.

BRIEF DESCRIPTION OF THE DRAWINGS

The accompanying drawings illustrated here are used to provide a further understanding of the present disclosure and constitute a part of the present disclosure. The illustrative embodiments of the present disclosure and their descriptions are used to explain the present disclosure and do not constitute an undue limitation of the present disclosure. In the attached drawings.

DETAILED DESCRIPTION OF THE EMBODIMENTS

Figure 1:
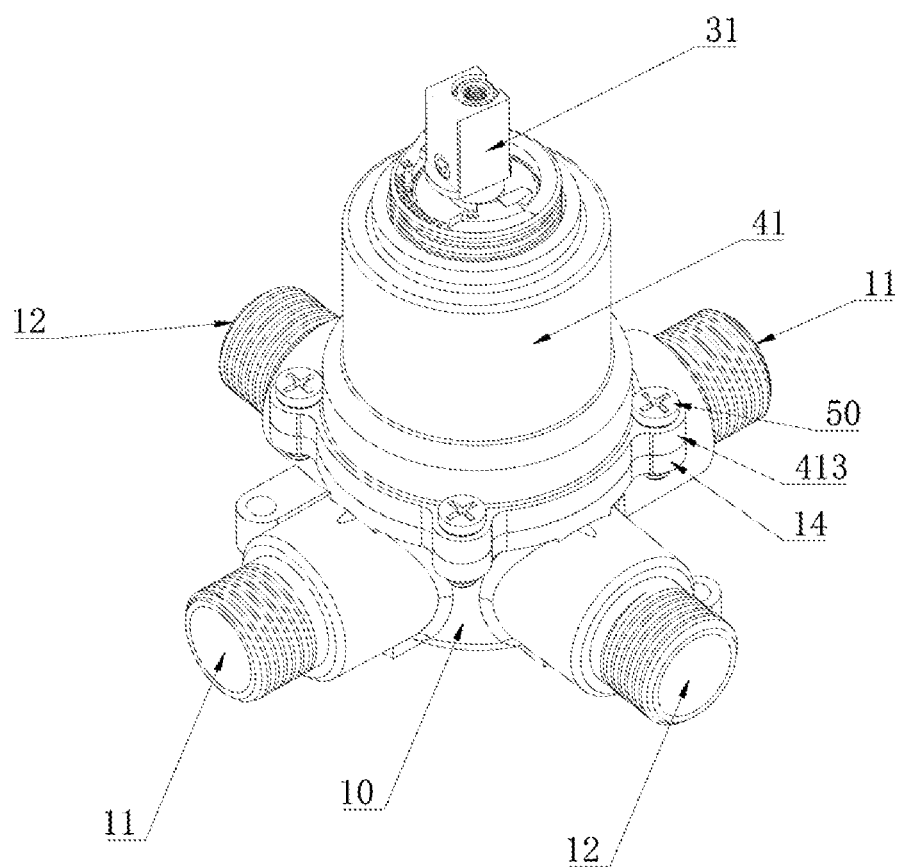
FIG. 1 is an assembly view of a three-dimensional structure of a concealed installed water outlet control device according to a first embodiment of the present disclosure.

In order to make the technical problems, technical schemes and beneficial effects to be solved by the present disclosure understandable more clearly, the present disclosure will be further described in detail with the attached drawings and embodiments hereinafter. It should be understood that the specific embodiments described here are only used to explain the present disclosure, rather than limit the present disclosure.

As shown in FIG. 1 to FIG. 5, a concealed installed water outlet control device according to the first embodiment of the present disclosure comprises a water outlet control component as an independent module and a water passing body 10, wherein the water outlet control module comprises a water distributor 20, a valve core 30 and a connector 40. The water passing body 10 is pre-embedded in the wall and is connected with the waterway pre-embedded in the wall. After the water passing body 10 is pre-embedded, the water outlet control component can be integrally assembled and disassembled with the water passing body 10 as an independent module.

The water passing body 10 is provided with an inner cavity with a top opening 13 and at least one water inlet interface 11 and at least one water outlet interface 12 provided on the side wall of the inner cavity. Specifically, in this embodiment, there are two water inlet interfaces 11 for hot water inflow and cold water inflow (see FIG. 4), and there are also two water outlet interfaces 12. Of course, the number of the water inlet interfaces 11 and the water outlet interfaces 12 is not limited.

Figure 2:
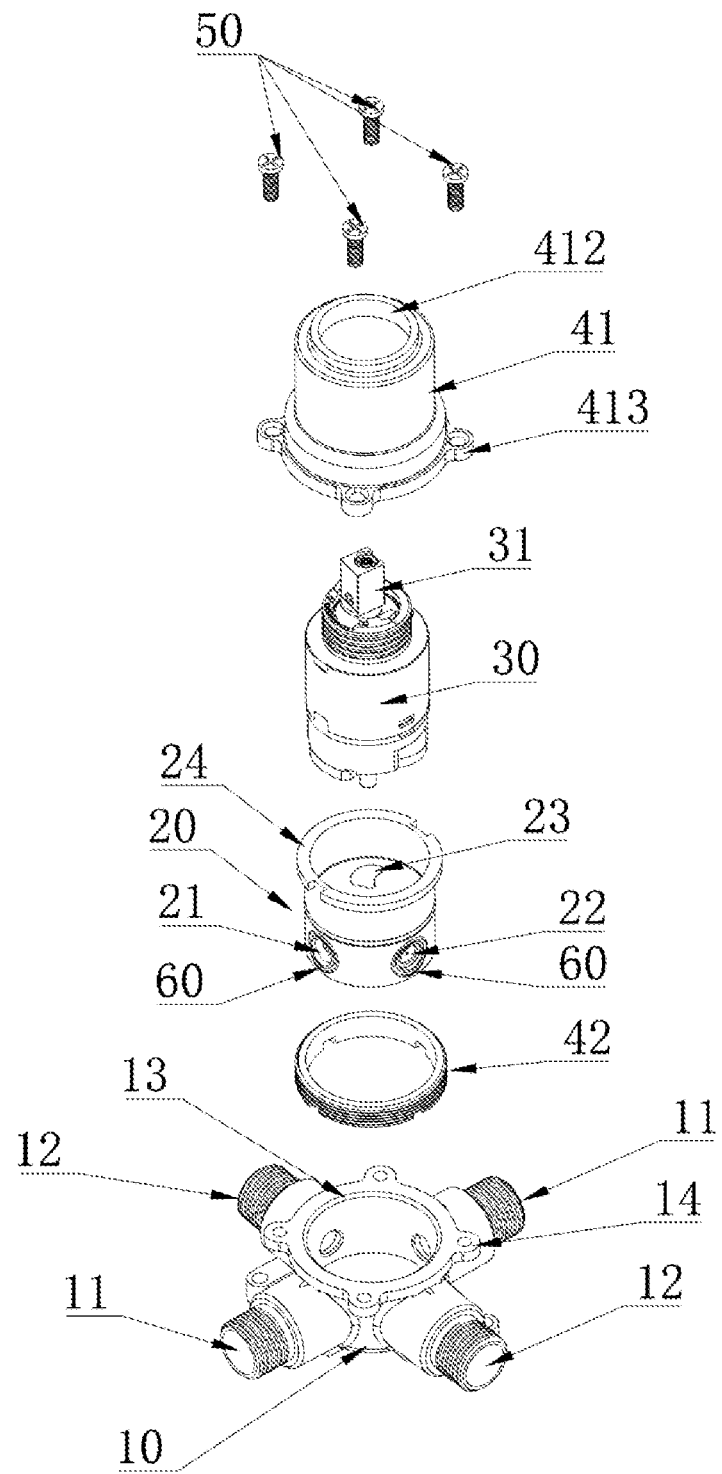
FIG. 2 is an explosive view of a three-dimensional structure of a concealed installed water outlet control device according to a first embodiment of the present disclosure.
Figure 3:
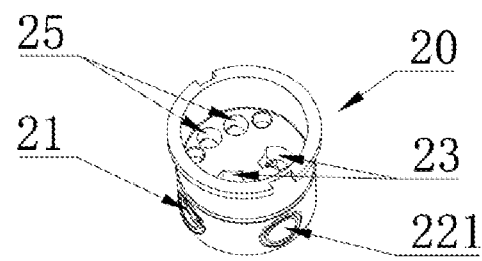
FIG. 3 is a schematic view of a three-dimensional structure of a water distributor according to a first embodiment of the present disclosure.
Figure 4:
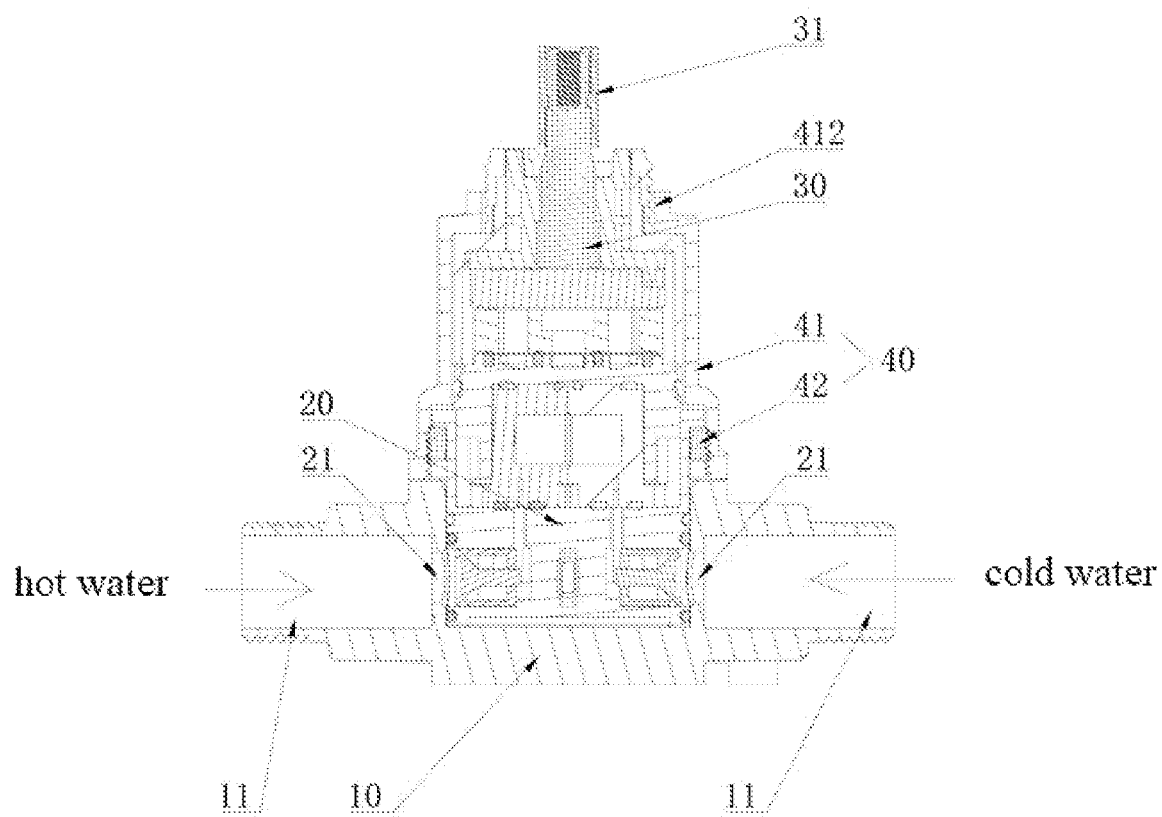
FIG. 4 is a cross-sectional view of a concealed installed water outlet control device according to a first embodiment of the present disclosure.
Figure 5:
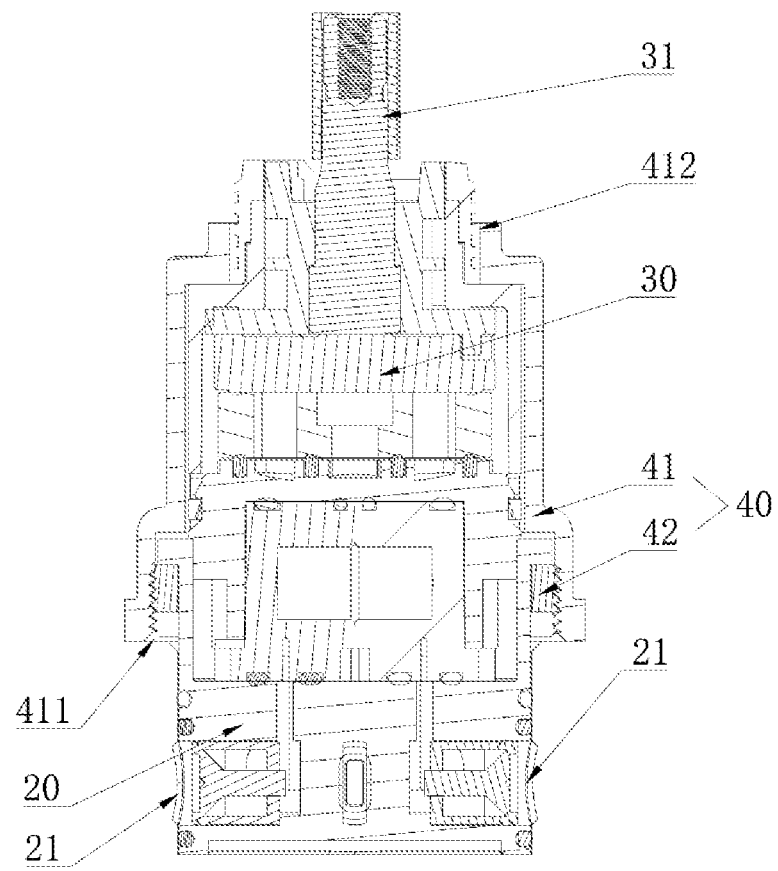
FIG. 5 is a cross-sectional view of a water outlet control component according to a first embodiment of the present disclosure.
Figure 6:
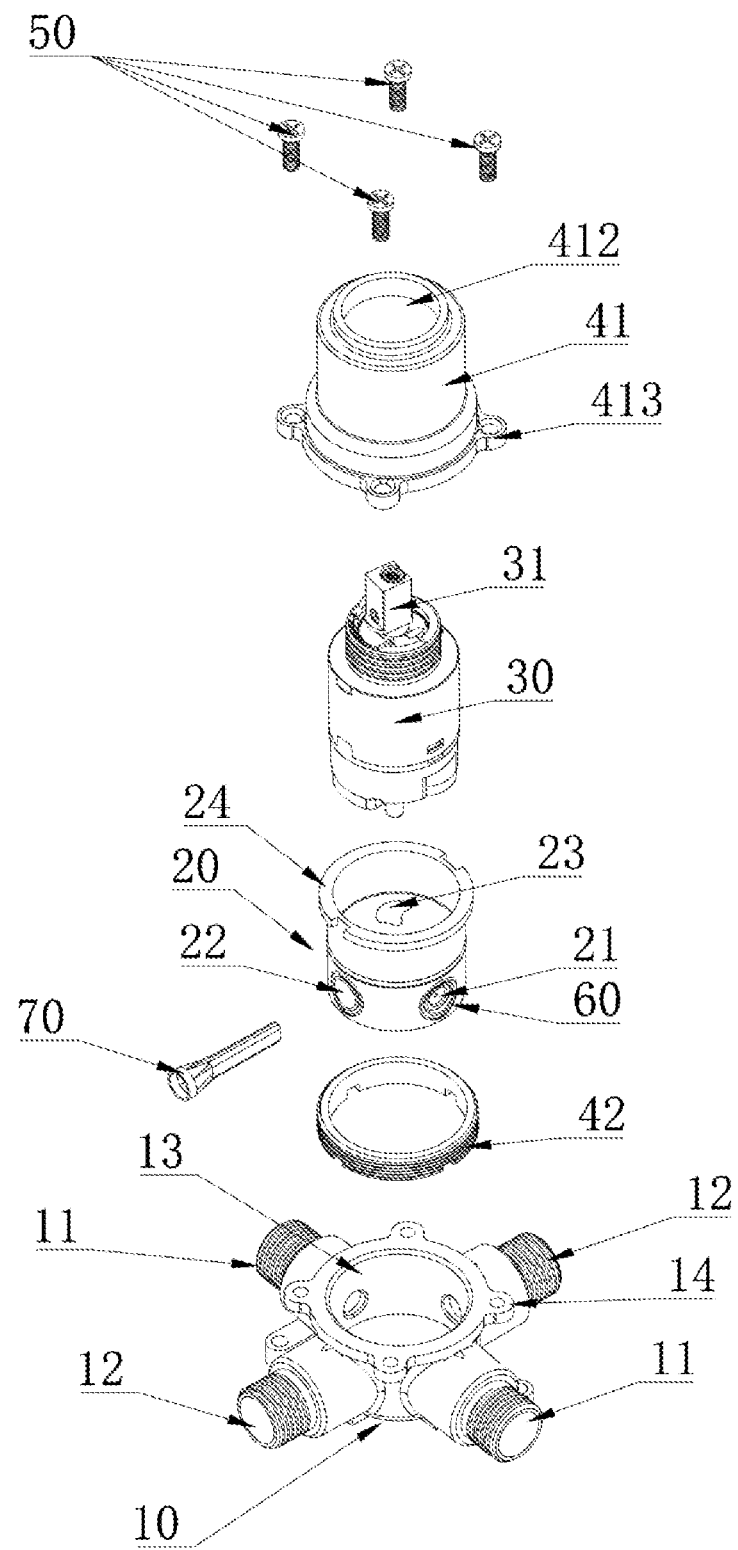
FIG. 6 is a first explosive view of a three-dimensional structure of a concealed installed water outlet control device according to a second embodiment of the present disclosure.
Figure 7:
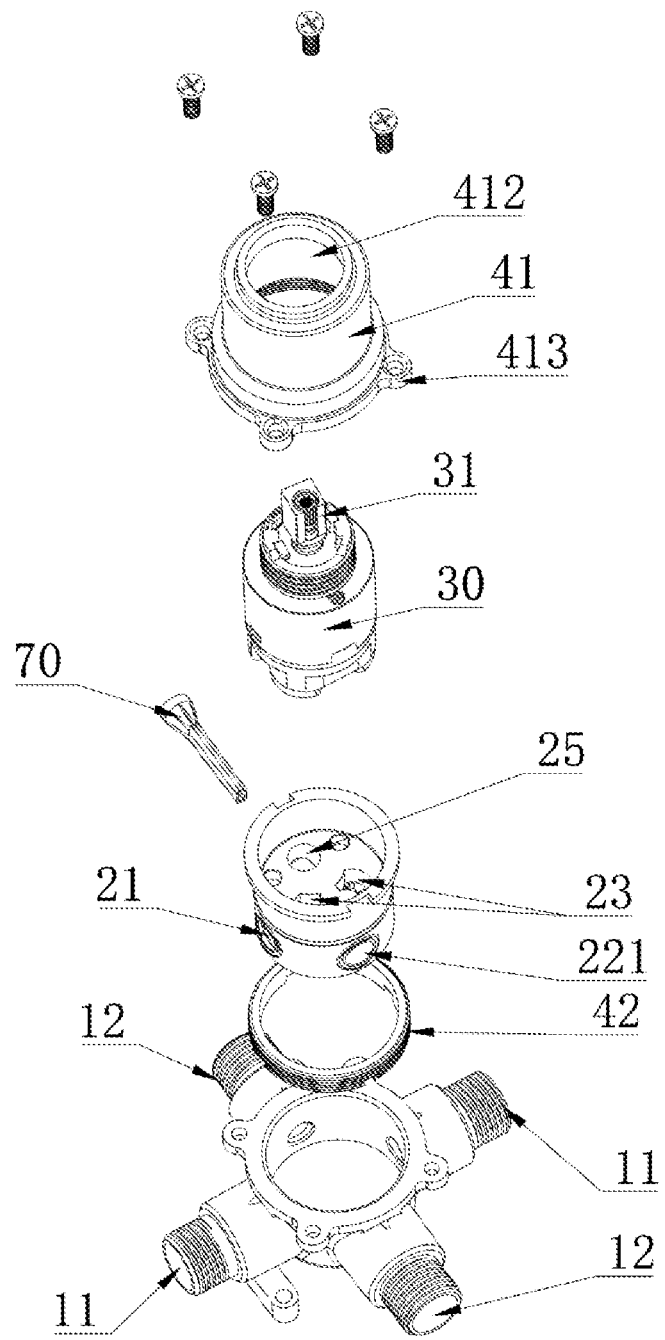
FIG. 7 is a second explosive view of a three-dimensional structure of a concealed installed water outlet control device according to a second embodiment of the present disclosure.

As shown in FIG. 2 and FIG. 3, the side wall of the water distributor 20 is provided with side water inlet through-flow openings 21 corresponding to each of the water inlet interfaces 11 one by one and side water outlet through-flow openings 22 corresponding to each of the water outlet interfaces 12 one by one. The water distributor 20 is further provided with end surface water inlet through-flow openings 23 corresponding to each of the side water inlet through-flow openings 21 one by one and end surface water outlet through-flow openings 25 corresponding to each of the side water outlet through-flow openings 22 one by one. Corresponding to the number of the water inlet interfaces 11 and the water outlet interfaces 12, two side water inlet through-flow openings 21 and two side water outlet through-flow openings 22 in this embodiment are further provided, respectively. Correspondingly, two end surface water inlet through-flow openings 23 and two end surface water outlet through-flow openings 25 are further provided, respectively. The water inlet interfaces 11, the side water inlet through-flow openings 21 and the end surface water inlet through-flow openings 23 are communicated with each other one by one. The water outlet interfaces 12, the side water outlet through-flow openings 22 and the end surface water outlet through-flow openings 25 are communicated with each other one by one. The valve core 30 controls the connection or disconnection between the end surface water inlet through-flow opening 23 and the end surface water outlet through-flow opening 25. The valve core 30 only needs to adopt the existing known structure, and the specific structure of the valve core 30 will not be described in detail.

The connector 40 assembles the water distributor 20 and the valve core 30 into an integrated structure, thereby obtaining a modular water outlet control component. A first connecting structure is provided between the connector 40 and the water passing body 10, so that only the connector 40 and the water passing body 10 need to be disassembled and assembled during the disassembly and assembly. The water distributor 20 and the valve core 30 do not need to be separated and assembled, which is not only more convenient to be disassembled and assembled, but also can effectively avoid the problem of water leakage resulted from dislocation or looseness when the water distributor 20 and the valve core 30 are assembled after being separated. The product is more reliable.

In this embodiment, the connector 40 comprises a hollow valve sleeve 41. The bottom end of the valve sleeve 41 forms an opening 411. The valve sleeve 41 is sleeved on the part of the water distributor 20 and the valve core 30 outside the inner cavity of the water passing body 10 through the opening 411. The top end of the valve sleeve 41 is provided with a through hole 412 through which the control end 31 of the valve core 30 protrudes. The part of the water distributor 20 with the side water inlet through-flow opening 21 and the side water outlet through-flow opening 22 is located outside the valve sleeve 41, and extends into the inner cavity of the water passing body 10.

In this embodiment, the connector 40 further comprises a nut 42 with an external thread. The top end of the water distributor 20 is provided with an external flange 24. The nut 42 abuts against the external flange 24. The inner wall of the opening 411 of the valve sleeve 41 is provided with an internal thread matched with the nut 42. The water distributor 20 and the valve core 30 are assembled into an integrated structure through the threaded connection of the valve sleeve 41 and the nut 42. The connector 40 comprises a hollow valve sleeve 41 and a nut 42. The water distributor 20 and the valve core 30 are assembled into an integrated structure through the threaded connection of the valve sleeve 41 and the nut 42 so that the structure is simple and the assembly is convenient.

In other embodiments, the nut 42 may not be provided separately, but a second connecting structure may be provided between the water distributor 20 and the valve sleeve 41. The second connecting structure may be a threaded connecting structure or a snap connecting structure, as long as the water distributor and the valve sleeve can be connected. When the water distributing body 20 is connected with the valve sleeve 41, the valve core 30 is limited in the valve cavity encircled by the water distributing body 20 and the valve sleeve 41, so that the nut 42 can be omitted.

In this embodiment, the first connecting structure comprises a plurality of first connecting parts 413 which are provided at intervals in the circumferential direction on the outer wall of the bottom opening 411 of the valve sleeve 41 and a plurality of second connecting parts 14 which are provided at intervals in the circumferential direction on the outer wall of the top opening 13 of the water passing body 10. The first connecting parts 413 are provided with through first bolt holes. The second connecting parts 14 are provided with through second bolt holes. The first connecting structure further comprises a bolt 50 penetrating through the first bolt holes and the second bolt holes. The valve sleeve 41 is detachably connected with the water passing body 10 through the bolt 50.

In this embodiment, the side water inlet through-flow opening 21 and the side water outlet through-flow opening 22 are provided with seals 60, respectively, to be in sealing communication with the water inlet interface 11 and the water outlet interface 12. As a side sealing structure is used, the requirements on the connection strength of the first connecting structure can be reduced, and the risk of water channeling resulted from an improper installing force of the first connecting structure can be reduced.

In this embodiment, during assembly, first, the water distributor 20 and the valve core 30 are placed together correspondingly. Then, the nut 42 is sleeved on the outer wall of the water distributor 20, and the nut 42 abuts against the outer flange 24 of the water distributor 20. Next, the valve sleeve 41 is sleeved on the part of the water distributor 20 and the valve core 30 outside the inner cavity of the water passing body 10 through the opening 411, and the valve sleeve 41 is in threaded connection with the nut 42, so that the water distributor 20 and the valve core 30 are assembled into an integrated structure. The integrated structure is the water outlet control component. Finally, the first connecting part 413 on the valve sleeve 41 and the second connecting part 14 on the water passing body 10 are fixedly connected by the bolt 50, thus completing the assembly of the whole device. When the water distributor 20 and the valve core 30 need to be disassembled from the water passing body 10, it is only necessary to unscrew the bolt 50 to release the connection between the first connecting part 413 on the valve sleeve 41 and the second connecting part 14 on the water passing body 10, which is very convenient and reliable to be disassembled and assembled.

The concealed installed water outlet control device of the present disclosure can be used to control the ON/OFF and temperature adjustment of a shower. For example, one water outlet interface 12 of the water passing body 10 is communicated with the top shower, and the other water outlet interface 12 is communicated with the hand-held shower to adjust the temperature of the two water paths.

As shown in FIG. 6 to FIG. 9, the main difference between the concealed installed water outlet control device of the second embodiment of the present disclosure and the first embodiment is that two side water outlet through-flow openings 22 are provided in this embodiment, that is, a first side water outlet through-flow opening 221 and a second side water outlet through-flow opening 222, while only one end surface water outlet through-flow opening 25 is provided. The two side water outlet through-flow openings 22 are capable of being both communicated with the end surface water outlet through-flow opening 25. Moreover, a Venturi tube 70 is provided between the two side water outlet through-flow openings 22. Under the action of the Venturi tube 70, the water flow of the end surface water outlet through-flow opening 25 flows to one of the side water outlet through-flow openings 22. Moreover, when the downstream pipeline (not shown) of the side water outlet through-flow opening is blocked from water, the water flow of the end surface water outlet through-flow opening 25 is switched to the other of the side water outlet through-flow openings 22. Specifically, in this embodiment, the Venturi tube 70 controls the end surface water outlet through-flow opening 25 to be communicated with the first side water outlet through-flow opening 221 by default, and only when the downstream pipeline of the first side water outlet through-flow opening 221 is cut off and is blocked from water, the end surface water outlet through-flow opening 25 is switched to be communicated with the second side water outlet through-flow opening 222.

Figure 8:
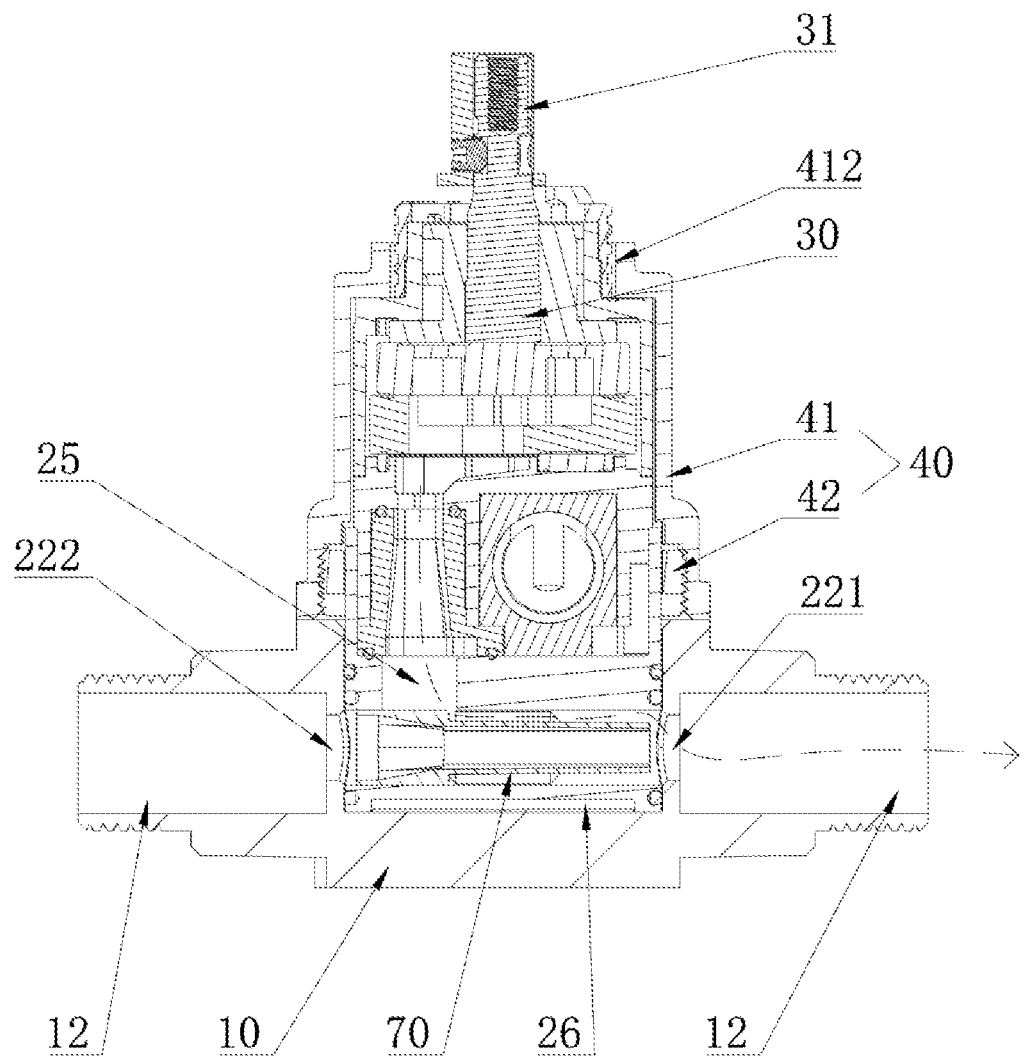
FIG. 8 is a first cross-sectional view of a concealed installed water outlet control device according to a second embodiment of the present disclosure.
Figure 9:
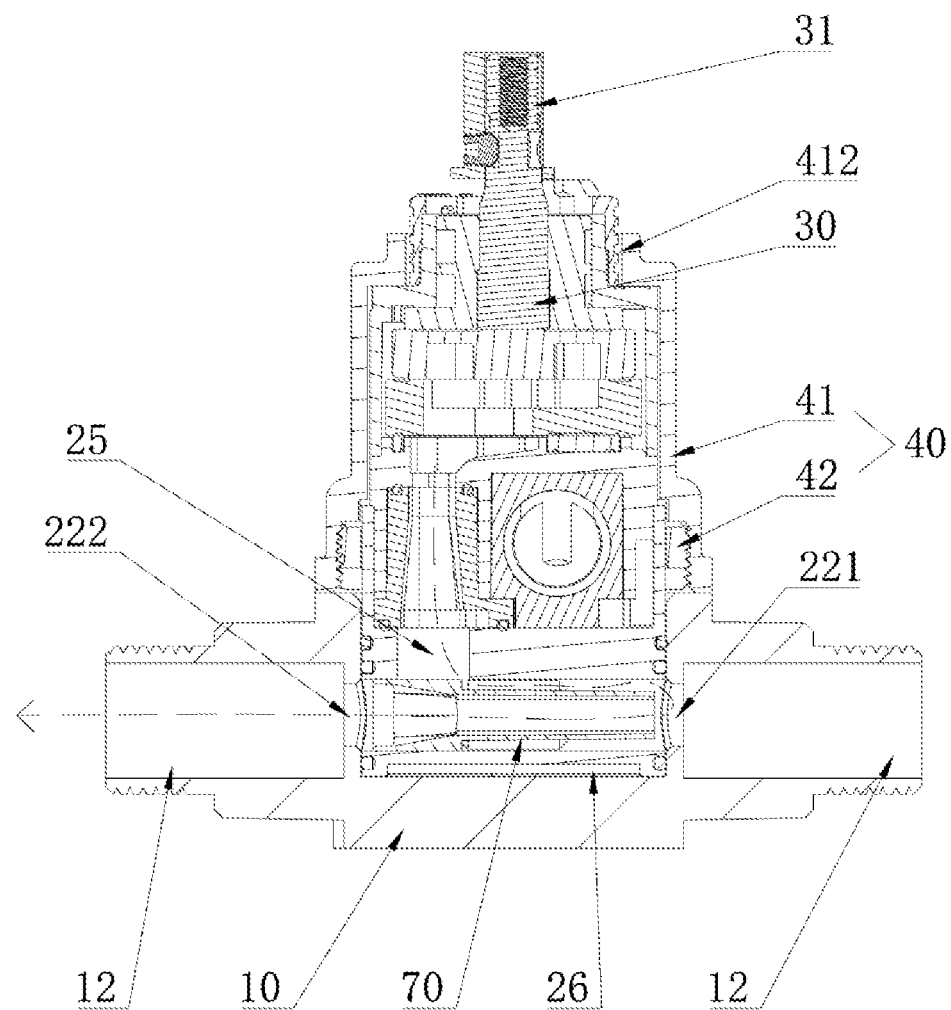
FIG. 9 is a second cross-sectional view of a concealed installed water outlet control device according to a second embodiment of the present disclosure.

In this embodiment, a communication channel 26 through which two of the side water outlet through-flow openings 22 are communicated with each other is provided in the water distributor 20. The Venturi tube 70 is provided in the communication channel 26. Moreover, there is an overflow gap between the outer wall of the Venturi tube 70 and the inner wall of the communication channel 26. The first end of the Venturi tube 70 extends to the first side water outlet through-flow opening 221, and the second end of the Venturi tube 70 is in sealing communication with the second side water outlet through-flow opening 222. As shown in FIG. 8, when the water outlet terminal (for example, a hand-held shower) communicated with the first side water outlet through-flow opening 221 is turned on, that is, when the downstream pipeline of the first side water outlet through-flow opening 221 is communicated with water, the water of the end surface water outlet through-flow opening 25 flows to the first side water outlet through-flow opening 221 through the overflow gap between the outer wall of the Venturi tube 70 and the inner wall of the communication channel 26, and then flows out of the first side water outlet through-flow opening 221. At this time, Due to the Venturi effect of the Venturi tube 70, the water of the end surface water outlet through-flow opening 25 does not enter the Venturi tube 70 and flows to the second side water outlet through-flow opening 222. As shown in FIG. 9, when the water outlet terminal (for example, a hand-held shower) communicated with the first side water outlet through-flow opening 221 is turned off, that is, when the downstream pipeline of the first side water outlet through-flow opening 221 is blocked from water, the water of the end surface water outlet through-flow opening 25 flows to the first side water outlet through-flow opening 221 through the overflow gap between the outer wall of the Venturi tube 70 and the inner wall of the communication channel 26, then enters the inner cavity of the Venturi tube 70, and then flows to the second side water outlet through-flow opening 222 and flows out of the second side water outlet through-flow opening 222, so that the water flow is switched to the water outlet terminal (for example, a top shower) communicated with the second side water outlet through-flow opening 222.

The above description has shown and described the preferred embodiments of the present disclosure. As mentioned above, it should be understood that the present disclosure is not limited to the form disclosed herein, and should not be regarded as the exclusion of other embodiments, but can be used in various other combinations, modifications and environments, and can be modified according to the above teachings or the technology or knowledge in related fields within the scope of the inventive concept described herein. However, modifications and changes made by those skilled in the art should be within the scope of protection of the appended claims of the present disclosure without departing from the spirit and scope of the present disclosure.

What is claimed is:

1. A water outlet control component, which is installed on a water passing body to control connection or disconnection between a water inlet interface and a water outlet interface provided on a side wall of the water passing body, comprising:
    a water distributor, wherein a side wall of the water distributor is provided with a side water inlet through-flow opening corresponding to the water inlet interface on the water passing body and a side water outlet through-flow opening corresponding to the water outlet interface on the water passing body, and the water distributor is further provided with an end surface water inlet through-flow opening corresponding to the side water inlet through-flow opening and an end surface water outlet through-flow opening communicated with the side water outlet through-flow opening;
    a valve core, which controls the connection or disconnection between the end surface water inlet through-flow opening and the end surface water outlet through-flow opening; and
    a connector, which assembles the water distributor and the valve core into an integrated structure, wherein the connector is provided with a first connecting part connected with the water passing body,
    wherein the connector comprises a hollow valve sleeve, the bottom end of the valve sleeve forms an opening, the valve sleeve is sleeved outside the water distributor and the valve core through the opening, the top end of the valve sleeve is provided with a through hole through which a control end of the valve core protrudes, a part of the water distributor with the side water inlet through-flow opening and the side water outlet through-flow opening is located outside the valve sleeve, and the first connecting part is provided on the valve sleeve.

2. The water outlet control component according to claim 1, wherein the connector further comprises a nut with an external thread, the top end of the water distributor is provided with an external flange, the nut abuts against the external flange, the inner wall of the opening of the valve sleeve is provided with an internal thread matched with the nut, and the water distributor and the valve core are assembled into an integrated structure through the threaded connection of the valve sleeve and the nut.

3. The water outlet control component according to claim 1, wherein the number of the side water outlet through-flow openings is the same as that of the end surface water outlet through-flow openings, and the side water outlet through-flow opening corresponds to the end surface water outlet through-flow opening.

4. The water outlet control component according to claim 1, wherein there are two side water outlet through-flow openings and one end surface water outlet through-flow opening, the two side water outlet through-flow openings are capable of being both communicated with the end surface water outlet through-flow opening, a Venturi tube is provided between the two side water outlet through-flow openings, under the action of the Venturi tube, the water flow of the end surface water outlet through-flow opening flows to one of the side water outlet through-flow openings, and when the downstream pipeline of the side water outlet through-flow opening is blocked from water, the water flow of the end surface water outlet through-flow opening is switched to the other of the side water outlet through-flow openings.

5. A concealed installed water outlet control device, comprising:
    a water passing body, which is provided with an inner cavity with a top opening and at least one water inlet interface and at least one water outlet interface provided on a side wall of the inner cavity;
    a water distributor, wherein a side wall of the water distributor is provided with a side water inlet through-flow opening corresponding to the water inlet interface and a side water outlet through-flow opening corresponding to the water outlet interface, and the water distributor is further provided with an end surface water inlet through-flow opening corresponding to the side water inlet through-flow opening and an end surface water outlet through-flow opening communicated with the side water outlet through-flow opening;
    a valve core, which controls the connection or disconnection between the end surface water inlet through-flow opening and the end surface water outlet through-flow opening; and
    a connector, which assembles the water distributor and the valve core into an integrated structure, wherein a first connecting structure is provided between the connector and the water passing body,
    wherein the connector comprises a hollow valve sleeve, the bottom end of the valve sleeve forms an opening, the valve sleeve is sleeved on a part of the water distributor and the valve core outside the inner cavity of the water passing body through the opening, the top end of the valve sleeve is provided with a through hole through which a control end of the valve core protrudes, and the part of the water distributor with the side water inlet through-flow opening and the side water outlet through-flow opening is located outside the valve sleeve.

6. The concealed installed water outlet control device according to claim 5, wherein the connector further comprises a nut with an external thread, the top end of the water distributor is provided with an external flange, the nut abuts against the external flange, the inner wall of the opening of the valve sleeve is provided with an internal thread matched with the nut, and the water distributor and the valve core are assembled into an integrated structure through the threaded connection of the valve sleeve and the nut.

7. The concealed installed water outlet control device according to claim 5, wherein a second connecting structure is provided between the water distributor and the valve sleeve, and when the water distributor is connected with the valve sleeve, the valve core is limited in a valve cavity encircled by the water distributor and the valve sleeve.

8. The concealed installed water outlet control device according to claim 5, wherein the first connecting structure comprises a plurality of first connecting parts which are provided at intervals in the circumferential direction on the outer wall of the bottom opening of the valve sleeve and a plurality of second connecting parts which are provided at intervals in the circumferential direction on the outer wall of the top opening of the water passing body, the first connecting parts are provided with through first bolt holes, the second connecting parts are provided with through second bolt holes, and the first connecting structure further comprises a bolt penetrating through the first bolt holes and the second bolt holes.

9. The concealed installed water outlet control device according to claim 5, wherein the connector and the water passing body are detachably connected through the first connecting structure.

10. The concealed installed water outlet control device according to claim 5, wherein the side water inlet through-flow opening and the side water outlet through-flow opening are provided with seals, respectively, to be in sealing communication with the water inlet interface and the water outlet interface.

11. The concealed installed water outlet control device according to claim 5, wherein the number of the side water outlet through-flow openings is the same as that of the end surface water outlet through-flow openings, and the side water outlet through-flow opening corresponds to the end surface water outlet through-flow opening.

12. The concealed installed water outlet control device according to claim 5, wherein there are two side water outlet through-flow openings and one end surface water outlet through-flow opening, the two side water outlet through-flow openings are capable of being both communicated with the end surface water outlet through-flow opening, a Venturi tube is provided between the two side water outlet through-flow openings, under the action of the Venturi tube, the water flow of the end surface water outlet through-flow opening flows to one of the side water outlet through-flow openings, and when the downstream pipeline of the side water outlet through-flow opening is blocked from water, the water flow of the end surface water outlet through-flow opening is switched to the other of the side water outlet through-flow openings.

* * * * *